(12) United States Patent
Cho et al.

(10) Patent No.: US 11,881,692 B2
(45) Date of Patent: Jan. 23, 2024

(54) INTERMEDIATE CONNECTION STRUCTURE OF POWER CABLE

(71) Applicant: LS CABLE & SYSTEM LTD., Anyang-si (KR)

(72) Inventors: Seung Woo Cho, Busan (KR); Chae Hong Kang, Gumi-si (KR); Si Ho Son, Daegu (KR); Su Bong Lee, Gumi-si (KR); Wook Jin Lee, Gumi-si (KR); Young June Park, Daegu (KR); Ho Jung Yun, Seoul (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 406 days.

(21) Appl. No.: 17/432,150

(22) PCT Filed: Feb. 19, 2020

(86) PCT No.: PCT/KR2020/002365
§ 371 (c)(1),
(2) Date: Aug. 19, 2021

(87) PCT Pub. No.: WO2020/171575
PCT Pub. Date: Aug. 27, 2020

(65) Prior Publication Data
US 2023/0133613 A1    May 4, 2023

(30) Foreign Application Priority Data

Feb. 20, 2019 (KR) .......................... 10-2019-0020018
Feb. 18, 2020 (KR) .......................... 10-2020-0019595

(51) Int. Cl.
*H02G 15/00* (2006.01)
*H02G 15/196* (2006.01)
(Continued)

(52) U.S. Cl.
CPC ............. *H02G 15/196* (2013.01); *H01B 7/22* (2013.01); *H01B 9/027* (2013.01)

(58) Field of Classification Search
CPC ......... H02G 15/196; H01B 7/22; H01B 9/027
See application file for complete search history.

(56) References Cited

U.S. PATENT DOCUMENTS

| 4,207,429 A  * | 6/1980 | Ward | .................. H02G 15/196 |
| | | | 156/49 |
| 10,411,456 B2 * | 9/2019 | Yaworski | ................. H02G 1/14 |
| 2018/0190409 A1 * | 7/2018 | Ghorbani | ............. H01B 7/2806 |

FOREIGN PATENT DOCUMENTS

| JP | 2003087925 A | 3/2003 |
| JP | 2008067507 A | 3/2008 |

(Continued)

OTHER PUBLICATIONS

International Search Report for related International Application No. PCT/KR2020/002365; report dated Aug. 27, 2020; (5 pages).

(Continued)

*Primary Examiner* — Pete T Lee
(74) *Attorney, Agent, or Firm* — K&L Gates LLP

(57) ABSTRACT

The present disclosure relates to a power cable and an intermediate connection structure, for connection thereof, which is capable of preventing the concentration of stress on a soldered part, which is configured to join a metal sheath of the power cable and a metal sheath restoration layer of the intermediate connection structure while ensuring airtight or watertight sealing therebetween, preventing deformation of or damage to the soldered part due to stress applied thereto, and minimizing thermal history in the power cable during the formation of the soldered part.

21 Claims, 7 Drawing Sheets

(51) Int. Cl.
    *H01B 7/22*  (2006.01)
    *H01B 9/02*  (2006.01)

(56)  References Cited

FOREIGN PATENT DOCUMENTS

| | | |
|---|---|---|
| JP | 2010104122 A | 5/2010 |
| KR | 101361961 B1 | 2/2014 |
| KR | 20180111459 A | 10/2018 |

OTHER PUBLICATIONS

Written Opinion for related International Application No. PCT/KR2020/002365; report dated Aug. 27, 2020; (6 pages).

* cited by examiner

INTERMEDIATE CONNECTION STRUCTURE OF POWER CABLE

CROSS-REFERENCE TO RELATED APPLICATIONS

The present application is a National Stage of International Application No. PCT/KR2020/002365 filed on Feb. 19, 2020, which claims the benefit of Korean Patent Application No. 10-2019-0020018, filed on Feb. 20, 2019, and Korean Patent Application No. 10-2020-0019595 filed on Feb. 18, 2020, filed with the Korean Intellectual Property Office, the entire contents of each hereby incorporated by reference.

FIELD

The present disclosure relates to an intermediate connection structure of a power cable. More specifically, the present disclosure relates to a power cable and an intermediate connection structure, for connection thereof, which is capable of preventing the concentration of stress on a soldered part, which is configured to join a metal sheath of the power cable and a metal sheath restoration layer of the intermediate connection structure while ensuring airtight or watertight sealing therebetween, preventing deformation of or damage to the soldered part due to stress applied thereto, and minimizing thermal history in the power cable during the formation of the soldered part.

BACKGROUND

Power cables that are used to supply power may be divided into a paper-insulated cable impregnated with insulating oil and an XPLE cable according to a material of an insulating layer outside a conductor.

Power cables may be connected using a joint box or the like according to a length of the power cables to be laid. A joint box of the paper-insulated power cable impregnated with insulating oil and a joint box of the XLPE power cable including a pre-mold joint (PMJ) may be in the form of a housing.

In order to laid a power cable a long distance at the seabed, a power cable wound about a turntable installed at a cable laying ship may be unwound and laid or separate power cables may be consecutively laid at the cable laying ship by intermediately connecting them through a joint box. A considerable amount of work time and costs are required for the intermediate connection of the power cables through the joint box at the cable laying ship or the like.

In this case, a method of winding power cables intermediately connected through a joint box about a drum or a turntable and consecutively laying the power cables may be considered, but the joint box is large in volume or is not flexible as described above and thus the intermediately connected power cables cannot be consecutively wound about a turntable or a drum of a cable laying ship. Therefore, a method of performing intermediate connection in a ship, which is a place for intermediate connection, should be applied.

In order to solve this problem, many researches and applications have been conducted on a flexible intermediate connection structure (hereinafter referred to as a "flexible joint") for submarine cables or power cables that are difficult to be intermediately connected at the spot.

The flexible joint is not a general intermediate connection structure but refers to an intermediate connection structure, of a power cable, which has an outer diameter substantially the same as those of cables, is freely bendable, and is used to connect cables at a cable manufacturing factory other than a cable laying site, and is also referred to as a factory joint because cables are connected thereby in a cable manufacturing process.

The flexible joint is substantially the same as cables, which are to be connected, in terms of an outer diameter and flexibility, and thus cables connected thereby may be laid consecutively by being wound about a turntable of a ship for laying submarine cables.

FIGS. 6 and 7 illustrate examples of an internal structure of a flexible intermediate connector 200 for connecting a pair of power cables. Specifically, FIG. 6 shows an example of an intermediate connector of a paper-insulated power cable, and FIG. 7 shows an example of an intermediate connector of an XLPE power cable.

A pair of power cables may be connected through the intermediate connector 200 in a state in which conductors 11, inner semiconducting layers (not shown), cable insulating layers 14, outer semiconducting layers 16, metal sheaths 22, metal strip layers 26, etc. are sequentially exposed and ends of the pair of power cables face each other. The intermediate connector 200 may include a conductor connection part 210 for connecting ends of a pair of the conductors 11, an insulating restoration layer 214 formed to surround the conductors 11 of the pair of power cables, the conductor connection part 210, and the insulating layers 14 of the pair of power cables, an outer semiconducting restoration layer 216 formed to surround the insulating restoration layer 214, a metal sheath restoration layer 222 covering an outer side of the outer semiconducting restoration layer 216, a metal strip restoration layer 226 formed outside the metal sheath restoration layer 222, and the like.

The insulating restoration layer 214, the outer semiconducting restoration layer 216, the metal sheath restoration layer 222, and the metal sheath restoration layer 226 may be formed of the same or substantially the same materials as the insulating layers 14, the outer semiconducting layers 16, the metal sheaths 22, and the metal strip layers 26 of the power cables 100a and 100b.

The insulating restoration layer 214, the outer semiconducting restoration layer 216, and the metal sheath restoration layer 226 excluding the metal sheath restoration layer 222 among the insulating restoration layer 214, the outer semiconducting restoration layer 216, the metal sheath restoration layer 222, and the metal sheath restoration layer 226 of the intermediate connector 200 of FIGS. 6 and 7 may be restored by spirally cross-winding insulating paper, a non-cross-linked polypropylene tape, a semiconductive tape, a metal strip, or the like in the same way as the components of the power cables corresponding thereto.

In the case of the XLPE power cable of FIG. 7, an insulating restoration layer may be restored using a cross-linked XLPE material obtained by applying and molding non-cross-linked polypropylene.

The metal sheaths 22 of the power cables 100a and 100b are sealing means for preventing the permeation of foreign substances such as moisture into the power cables 100a and 100b and preventing the loss of insulating oil in the case of a paper-insulated cable, and may be formed of a material such as a thin lead sheath.

In the case of a paper-insulated power cable, sealing of the metal sheath restoration layer 222 for restoring the metal sheath 22 is difficult to guarantee due to the internal pressure of insulating oil or mechanical stress applied when an intermediate connector is bent, and thus, the metal sheath restoration layer 222 cannot be restored by spirally cross-winding a lead tape or sheet and may be formed by mounting a lead tube corresponding to a length of the intermediate connection part 200 on a side of each of the pair of power cables 100a and 100b to be connected, restoring the outer semiconducting restoration layer 216, etc., moving the lead tube to a position of the intermediate connection part 200, performing tube reduction, and forming a soldered part 2221 by soldering the lead tube and the end of the metal sheath 22.

When the restoration of the metal sheath restoration layer 222 is completed, the intermediate connector 200 of a flexible joint type may be completed by restoring the metal sheath restoration layer 226 by cross-winding a metal strip and restoring an outer part (not shown).

In the related art, in order to form the soldered part on a boundary area between the metal sheath 22 and the lead tube constituting the metal sheath restoration layer 222, the lead tube constituting the metal sheath restoration layer 222 is stacked on an end of the metal sheath 22, and a soldered part is formed on an end region of the lead tube (namely, "lap-soldering") as shown in FIGS. 6 and 7.

Particularly, a diameter of the intermediate connector of the flexible joint type is preferably substantially the same as that of a cable but may increase and the flatness of a surface of the intermediate connector may deteriorate in a lap-soldered region.

When the soldered part is formed on the boundary area between the end of the lead tube and the metal sheath 22 without additional processing while the end of the lead tube constituting the metal sheath restoration layer 222 is stacked on or overlaps the metal sheath 22, stress may be concentrated on the place of stacking due to internal pressure, mechanical stress applied when bent, stress applied when the soldered part is pressed due to a metal strip or an outer layer such as an armor provided after the completion of the intermediate connector.

When stress is concentrated on a region of the soldered part, the intermediate connector is likely to be wrinkled when bent or curved and may be cracked or broken when repeatedly bent or curved, and thus, a sealing function of the metal sheath or the metal sheath restoration layer may be damaged.

SUMMARY

The present disclosure relates to a power cable, and an intermediate connection structure for connection thereof, which is capable of preventing concentration of stress on a soldered part, which is configured to join a metal sheath of the power cable and a metal sheath restoration layer of the intermediate connection structure while ensuring airtight or watertight sealing therebetween, or deformation or breakage of the soldered part due to stress, and minimizing thermal history of the inside of the power cable during the formation of the soldered part.

To provide the technical solution against the technical problems, the present disclosure provides an intermediate connection structure of a power cable for connecting a pair of power cables, wherein the power cable comprises a conductor, an inner semiconducting layer outside the conductor, a cable insulating layer outside the inner semiconducting layer, an outer semiconducting layer outside the cable insulating layer, and a metal sheath outside the outer semiconducting layer, and the intermediate connection structure comprises a conductor connection part to which a pair of conductors are connected, an inner semiconducting restoration layer outside the exposed conductor of the power cable and the conductor connection part, an insulating restoration layer for covering at least portions of the inner semiconducting restoration layer and the cable insulating layer, an outer semiconducting restoration layer outside the insulating restoration layer, and a metal sheath restoration layer outside the outer semiconducting restoration layer, wherein an end of the metal sheath of the power cable and an end of the metal sheath restoration layers are spaced a predetermined distance from each other, a metal taping layer is provided below a boundary area between the end of the metal sheath of the power cable and the end of the metal sheath restoration layer, and the boundary area is finished with a soldered part.

And a width of the metal taping layer may be greater than the predetermined distance.

And the predetermined distance may be in a range of 5 mm to 20 mm.

And the end of the metal sheath and the end of the metal sheath restoration layer may taper from top to bottom to have inclined surfaces facing each other.

And widths of the inclined surfaces of the end of the metal sheath and the end of the metal sheath restoration layer in a longitudinal direction of the intermediate connection structure may be 20 mm or less.

And the entire inclined surfaces of the end of the metal sheath and the end of the metal sheath restoration layer may be finished with the soldered part.

And a width of the soldered part may be in a range of 20 mm to 60 mm.

And a maximum thickness of the soldered part may be 1 to 1.3 times a thickness of the metal sheath or a thickness of the metal sheath restoration layer.

And a maximum thickness of the soldered part may be 10 mm or less.

And the metal taping layer may be in contact with the end of the metal sheath, the end of the metal sheath restoration layer, and the soldered part.

And an outer diameter of the intermediate connection structure may be 1.02 to 1.1 times that of the power cable.

And the conductor connection part, the inner semiconducting restoration layer, the insulating restoration layer, the outer semiconducting restoration layer, and the metal sheath restoration layer may be located at the same layers as the conductor, the inner semiconducting layer, the cable insulating layer, the outer semiconducting layer, and the metal sheath.

And to provide the technical solution against the technical problems, the present disclosure provides an intermediate connection structure for connection of a power cable which includes a conductor, an inner semiconducting layer, a cable insulating layer, an outer semiconducting layer, and a metal sheath, and the intermediate connection structure comprises a conductor connection part to which the conductor of the power cable is connected; an insulating restoration layer for covering at least portions of the conductor of the power cable, the conductor connection part, and the cable insulating layer; an outer semiconducting restoration layer restored outside the insulating restoration layer; and a metal sheath restoration layer restored outside the outer semiconducting restoration layer, wherein an insulation means is provided below a boundary area between an end of the metal sheath of the power cable and an end of the metal sheath restoration layer, and the boundary area below which the insulation means is provided is finished with a soldered part.

And the end of the metal sheath of the power cable and the end of the metal sheath restoration layer may be spaced a predetermined distance from each other.

And the insulation means may be configured by winding a copper tape, wherein a width of the copper tape is greater than the predetermined distance.

And the end of the metal sheath of the power cable and the end of the metal sheath restoration layer may be inclined surfaces facing each other, and the soldered part is configured to finish the entire inclined surfaces.

And to provide the technical solution against the technical problems, the present disclosure provides an intermediate connection structure for connection of a power cable which includes a conductor, an inner semiconducting layer, a cable insulating layer, an outer semiconducting layer, and a metal sheath, and the intermediate connection structure comprises a conductor connection part to which a pair of conductors are connected, an insulating restoration layer for covering at least portions of the exposed conductor of the power cable, the conductor connection part, and the cable insulating layer, an outer semiconducting restoration layer restored outside the insulating restoration layer, and a metal sheath restoration layer restored outside the outer semiconducting restoration layer, wherein an outer circumferential surface of an end of the metal sheath and an outer circumferential surface of an end of the metal sheath restoration layer are processed as inclined surfaces, the end of the metal sheath restoration layer is stacked on the end of the metal sheath, and a soldered part is formed at a boundary area between the outer circumferential surface of the end of the metal sheath restoration layer and the outer circumferential surface of the end of the metal sheath.

And the end of the metal sheath and the end of the metal sheath restoration layer may taper from top to bottom and thus the outer circumferential surfaces thereof may be inclined surfaces facing each other.

And widths of the inclined surfaces of the end of the metal sheath and the end of the metal sheath restoration layer in a longitudinal direction of the intermediate connection structure may be 20 mm or less.

And a width of the soldered part may be in a range of 20 mm to 60 mm.

And a maximum thickness of the soldered part on the boundary area may be 10 mm or less.

In an intermediate connection structure of a power cable according to the present disclosure, ends of a metal sheath of a power cable and a metal sheath restoration layer of the intermediate connection structure may be separated from each other inside a soldered part for airtightly joining the metal sheath and the metal sheath restoration layer, thereby minimizing an increase of a thickness of the intermediate connection structure due to the soldered part.

In the intermediate connection structure of a power cable according to the present disclosure, ends of the metal sheath of the power cable and the metal sheath restoration layer of the intermediate connection structure may be processed to have inclined surfaces inside the soldered part, so that stress or concentration of stress inside the soldered part may be alleviated and a thickness of the soldered part may be gently changed.

In the intermediate connection structure of a power cable according to the present disclosure, a metal taping layer may be provided as a heat dissipating means below a boundary area between the end of the metal sheath of the power cable and the end of the metal sheath restoration layer of the intermediate connection structure to minimize thermal history due to heat applied during the formation of the soldered part.

In the intermediate connection structure of a power cable according to the present disclosure having the above structure, the concentration of stress on the soldered part or a peripheral region due to internal or external pressure applied to the soldered part or deformation or breakage of the soldered part or the peripheral region may be reduced and thus the watertightness or airtightness of the intermediate connection structure may be improved.

In the intermediate connection structure of a power cable according to the present disclosure, flexural characteristics of the power cable when repeatedly bent with respect to the intermediate connection structure may be improved, because the concentration of stress on the soldered part and the peripheral region or deformation or breakage of the soldered part due to stress may be reduced.

In addition, in the intermediate connection structure of a power cable according to the present disclosure, the end of the metal sheath of the power cable and the end of the metal sheath restoration layer of the intermediate connection structure may be processed to have inclined surfaces inside the soldered part and a boundary area therebetween is soldered in a state in which the ends are separated from each other, so that areas of the ends of the metal sheath and the metal sheath restoration layer, which are finished with the soldered part, may be increased to improve tensile characteristics when tension is applied to the intermediate connection structure of a power cable as a boundary.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

In general, power cables are connected through a joint box at intervals of several hundreds of meters or several kilometers and ends thereof are connected to an overhead line due to the joint box. First, a power cable 100 and an intermediate connection structure 200 for connection thereof will be described below.

Figure 1:
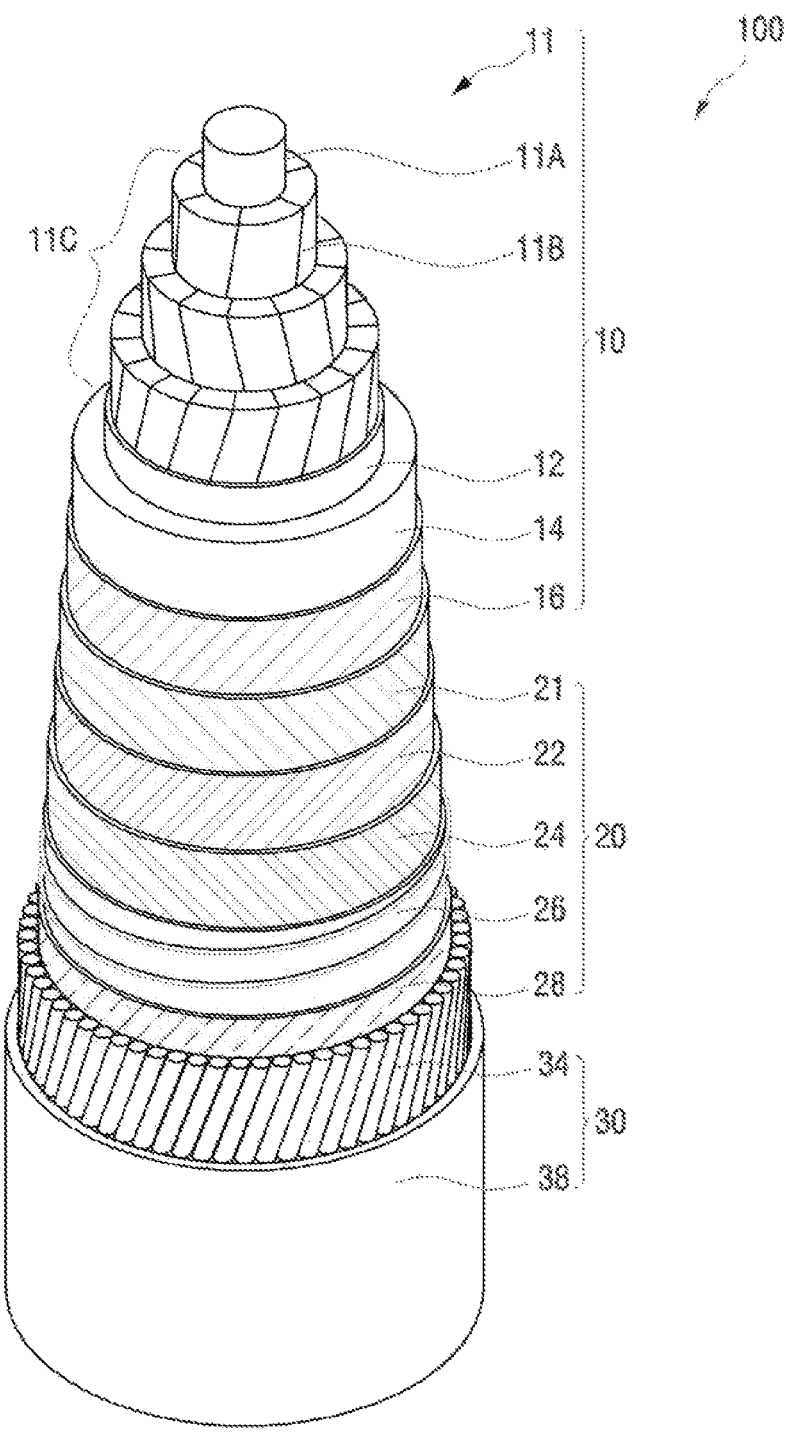
FIG. 1 is a cutaway perspective view of a submarine power cable which is an example of a power cable.

FIG. 1 is a cutaway perspective view of a submarine power cable 100 which is an example of a power cable.

Referring to FIG. 1, the submarine power cable 100 includes a cable core part 10 having a conductor 11, an inner semiconducting layer 12, a cable insulating layer 14, and an outer semiconducting layer 16, and is configured to transmit power along the conductor 11 only in a longitudinal direction of the submarine power cable 100 and prevent leakage of current in a radial direction of the submarine power cable 100.

The conductor 11 acts as a path through which current flows to transmit power, and may be formed of a material, e.g., copper or aluminum, which has high conductivity to minimize power loss and has strength and flexibility appropriate to manufacture and use a cable.

As illustrated in FIG. 1, the conductor 11 may be a flat conductor 11 including a flat wire layer 11c, which consists of a round central wire 11a and a flat wire 11b twisted to cover the round central line 11a, and having an overall round cross section. As another example, the conductor 11 may be a circular compressed conductor 11 obtained by twisting a plurality of round wires and compressing them into a circular shape. The flat conductor 11 has a higher space factor than that of the circular compressed conductor 11 and thus may contribute to reduction of an outer diameter of a cable.

Because the conductor 11 is formed by twisting a plurality of wires, a surface thereof is not smooth and thus an electric field may not be uniform and a corona discharge is likely to occur locally. When there is a gap between the surface of the conductor 11 and the cable insulating layer 14 described below, insulation performance may decrease.

To solve this problem, the inner semiconducting layer 12 may be formed outside the conductor 11. The inner semiconducting layer 12 may include an insulating material to which conductive particles such as carbon black, carbon nanotubes, carbon nanoplates, or graphite are added and thus may have a semiconductive property.

The inner semiconducting layer 12 may prevent a sudden change in an electric field between the conductor 11 and the cable insulating layer 14 described below, thereby stabilizing insulation performance. In addition, the inner semiconducting layer 12 may suppress a non-uniform charge distribution on a surface of the conductor 11 to achieve a uniform electric field and may prevent a gap between the conductor 11 and the cable insulating layer 14 to suppress a corona discharge, dielectric breakdown, etc.

The cable insulating layer 14 is provided outside the inner semiconducting layer 12 to electrically insulate the inner semiconducting layer 12 from the outside so that current flowing through the conductor 11 may not leak to the outside.

As illustrated in FIG. 1, the cable insulating layer 14 may be formed of insulating paper impregnated with insulating oil or XLPE. That is, the cable insulating layer 14 may be formed by winding insulating paper in multiple layers to surround the inner semiconducting layer 12 and impregnating the insulating paper with the insulating oil after forming the cable core part (in the case of a paper-insulated power cable) or may be formed by forming an XLPE insulating layer by cross-linking a polyethylene material (in the case of an XLPE power cable).

The outer semiconducting layer 16 may be provided outside the cable insulating layer 14. Similar to the inner semiconducting layer 12, the outer semiconducting layer 16 is formed of a material having a semiconductive property, e.g., an insulating material to which conductive particles, e.g., carbon black, carbon nanotubes, carbon nanoplates, or graphite, are added, to suppress a non-uniform charge distribution between the cable insulating layer 14 and the metal sheath 22 described below, thereby stabilizing insulation performance. In addition, the outer semiconducting layer 16 may planarize a surface of the cable insulating layer 14 to mitigate electric field concentration in the power cable 100, thus preventing a corona discharge, and physically protect the cable insulating layer 214.

The cable core part 10 may further include a moisture absorbing layer 21 to prevent moisture from penetrating the power cable 100. The moisture absorbing layer 21 may be formed between the stranded wires of the conductor 11 and/or outside the conductor 11, and provided in the form of powder, a tape, a coating layer, or a film containing a super absorbent polymer (SAP) capable of quickly absorbing moisture permeating a cable and maintaining a state of absorbing the moisture, thereby preventing permeation of moisture in the longitudinal direction. In addition, the moisture absorbing layer 21 may have semiconductivity to prevent a sudden electric field change.

A cable protection part 20 may be provided outside the cable core part 10, and the power cable 100 may further include the cable armor 30 when laid at the bottom of the sea. The cable protection part 20 and the cable armor 30 protect the cable core part 10 from various environmental factors, such as moisture penetration, mechanical trauma, and corrosion, which may affect power transmission performance of the power cable 100.

The cable protection part 20 includes the metal sheath 22 and a polymer sheath 24 to protect the power cable 100 from fault current, external forces, and other external environmental factors.

The metal sheath 22 may be formed to surround the cable core part 10. In particular, when the power cable 100 is laid in an environment such as the sea bottom, the cable core part 10 may be sealed to prevent the permeation of foreign substances such as moisture thereinto, and a molten metal may be extruded on the outside of the cable core part 10 to make the cable core part 10 have seamless and continuous outer sides, thereby enhancing watertightness performance. The molten metal may be lead or aluminum, preferably, lead having excellent corrosion resistance to seawater when the power cable 100 is laid at the sea bottom, and more preferably, a lead alloy containing a metal element to reinforce mechanical properties.

The metal sheath 22 may be grounded at an end of the power cable 100 to serve as a path through which fault current flows when an accident such as a ground fault or a short circuit occurs, protect the power cable 100 from external shocks, and prevent an electric field from being discharged to the outside of the power cable 100.

Furthermore, an anticorrosion compound, e.g., blown asphalt, may be applied onto a surface of the metal sheath 22 to additionally improve corrosion resistance, watertightness, etc. of the power cable 100 and improve adhesion to the polymer sheath 24.

Furthermore, a nonwoven copper wire tape or a moisture absorbing layer 21 may be additionally provided between the metal sheath 22 and the cable core part 10. The nonwoven copper wire tape includes copper wire, a nonwoven tape, and the like to facilitate electrical contact between the outer semiconducting layer 16 and the metal sheath 22. The moisture absorbing layer 21 is provided in the form of powder, a tape, a coating layer, a film or the like containing a super absorbent polymer (SAP) capable of quickly absorbing moisture permeating the power cable 100 and maintaining a state of absorbing the moisture to prevent penetration of moisture in the longitudinal direction of the power cable 100. In addition, the nonwoven copper wire tape and the moisture absorbing layer 21 may preferably have a semiconductive property to prevent a sudden change in an electric field, and the moisture absorbing layer 21 may include copper wire to be supplied with electric current and to absorb moisture.

The polymer sheath 24 may be formed outside the metal sheath 22 to improve corrosion resistance, watertightness, etc. of the power cable 100 and protect the power cable 100 from other external environmental factors such as mechanical trauma, heat, and ultraviolet rays. The polymer sheath 24 may be formed of a resin such as polyvinyl chloride (PVC) or polyethylene, and preferably, polyethylene resin having excellent watertightness when the power cable 100 is laid at the sea bottom and preferably, polyvinyl chloride (PVC) resin in an environment requiring flame retardancy.

The power cable 100 may include a metal strip layer 26 outside the polymer sheath 24 in the form of a galvanized steel tape or the like to prevent expansion of the metal sheath 22 due to expansion of the insulating oil. A bedding layer (not shown) formed of a semiconductive non-woven tape or the like may be provided on and/or below the metal strip layer 26 to buffer an external force applied to the power cable 100, and an outer sheath 28 formed of a resin such as polyvinyl chloride or polyethylene may be further provided to significantly improve corrosion resistance, watertightness, etc. of the power cable 100 and additionally protect the power cable 100 from other external environmental factors such as mechanical trauma, heat, ultraviolet rays, etc.

The power cable 100, when laid at the sea bottom, is likely to be damaged by the anchor of a ship, a bending force applied due to sea currents or waves, friction with the sea bottom, etc., and thus may further include the cable armor 30 outside the cable protection part 20 to prevent this problem.

The cable armor 30 may include a metal armor layer 34 and a serving layer 38. The metal armor layer 34 may be formed of steel, galvanized steel, copper, brass, bronze, or the like, formed by cross-winding armor wire having a round or flat cross-section in at least one layer, enhance mechanical properties and performance of the power cable 100, and additionally protect the power cable 100 from an external force.

The serving layer 38 formed of polypropylene yarn or the like may be provided in one or more layers on and/or below the metal armor layer 34 to protect the power cable 100. The serving layer 38, which is an outermost layer, may be formed of two or more materials of different colors to secure visibility of the power cable 100 laid at the sea bottom.

Such power cables should be connected at predetermined intervals through an intermediate connector, but although the intermediate connector can be used for connection at the spot, an intermediate connector of a flexible joint type may be provided to perform intermediate connection during the manufacture of cables so that the cables may be transferred while being wound about a turntable installed in a cable laying ship, when costs for connection at the spot should be considered in the case of a submarine power cable.

An intermediate connection structure of a power cable according to the present disclosure will be described with reference to FIGS. 2 to 5 below.

Figure 2:
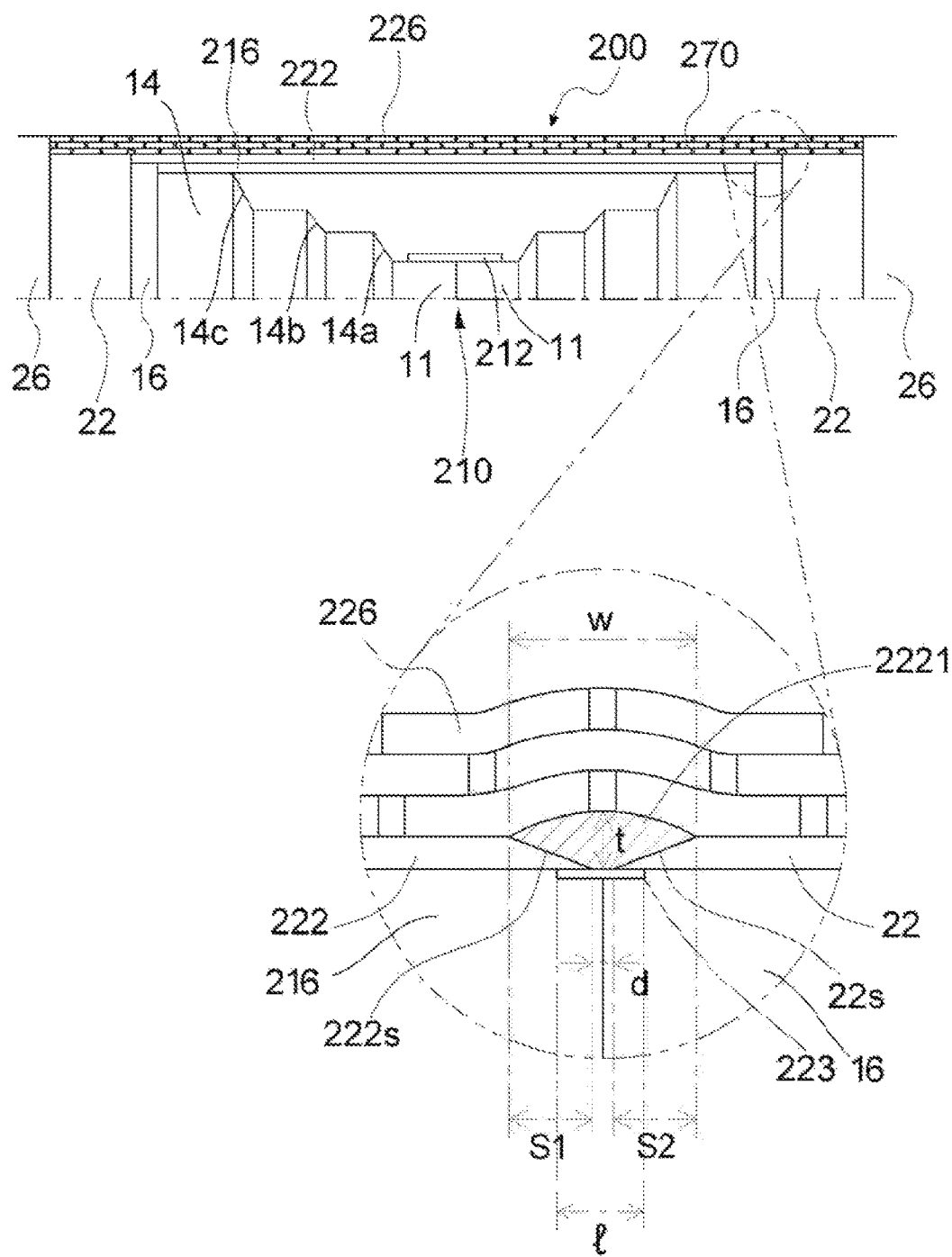
FIGS. 2 and 3 are cross-sectional views of examples of an intermediate connection structure of a power cable according to an embodiment of the present disclosure.
Figure 3:
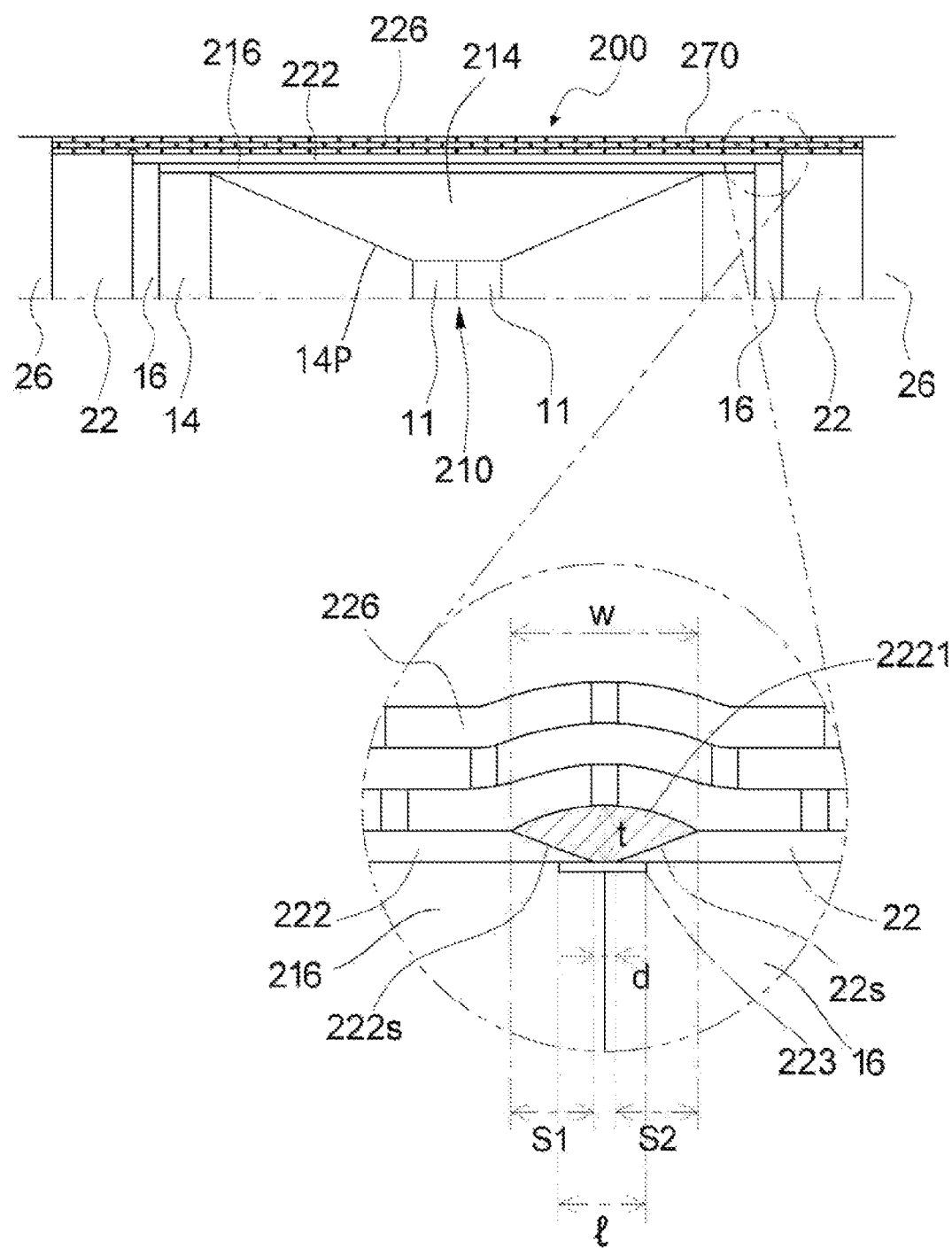

FIGS. 2 and 3 are cross-sectional views of examples of an intermediate connection structure of a power cable according to an embodiment of the present disclosure.

FIG. 2 is a cross-sectional view of an intermediate connection structure 1 of a power cable according to an embodiment of the present disclosure. In the intermediate connection structure 200 for connection of a pair of power cable according to the present disclosure, each of the power cables may include a conductor 11, an inner semiconducting layer (not shown) outside the conductor 11, a cable insulating layer 14 outside the inner semiconducting layer, an outer semiconducting layer 16 outside the cable insulating layer 14, and a metal sheath 22 outside the outer semiconducting layer 16; and the intermediate connection structure 200 may include a conductor connection part 210 for connecting the pair of conductors 11, an inner semiconducting restoration layer (not shown) provided outside the exposed conductor 11 of the power cable and the conductor connection part 210, an insulating restoration layer 214 covering at least portions of the inner semiconducting restoration layer and the cable insulating layer 14, an outer semiconducting restoration layer 216 outside the insulating restoration layer 214, and a metal sheath restoration layer outside the outer semiconducting restoration layer 216, wherein an end of the metal sheath 22 of the power cable and an end of the metal sheath restoration layer 222 are spaced apart a predetermined distance d from each other, a metal taping layer 223 is provided below a boundary area between the end of the metal sheath 22 of the power cable and the end of the metal sheath restoration layer 222, and the boundary area is finished with a soldered part 2221.

The conductor connection part 210, for connecting the conductors 11 of the pair of the power cables 100a and 100b, electrically and mechanically connects the pair of exposed conductors 11, and the pair of conductors 11 may be connected by being inserted into a conductor sleeve 212 and compressed together or by being inserted into a connection sleeve and filling a gap between ends thereof with a filler metal as illustrated in FIG. 2 or may be connected by directly welding cross sections thereof as illustrated in FIG. 3.

As shown in FIG. 2, when the conductors 11 are connected using the conductor sleeve 212, the conductor sleeve 212 may be a same-diameter conductor sleeve 212 having substantially the same outer diameter, when compressed, as that of the pair of exposed conductors 11, and an outer side of the conductor sleeve 212 may be compressed after ends of the pair of exposed conductors 11 are inserted into the conductor sleeve 212.

A thickness of the insulating restoration layer 214 described below may be reduced when the conductor sleeve 212 is configured as the same-diameter conductor sleeve 212 having an outer diameter substantially the same as those of the pair of conductors 11. Particularly, when a flexible joint or the like is configured, a total outer diameter of the intermediate connector 200 may be substantially the same as the outer diameter of the power cable 100 when the insulating restoration layer 214 of the intermediate connector 200 is configured as having the same outer diameter as that of an insulating layer of the power cable 100.

However, in the case of the XLPE power cable of FIG. 3, an increase in a diameter of a conductor connection part may be minimized by bringing conductors in contact with each other and welding the conductors together.

The exposed cable insulating layer 14 of the power cable 100 is penciled to have multi-step inclined surfaces 14a, 14b, and 14c as illustrated in FIG. 2 but may be penciled to have a single inclined surface 14P in the case of the XLPE power cable of FIG. 3. After connecting the conductors 11 through the conductor sleeve 212 or welding cross sections thereof, the insulating restoration layer 214 covering the conductor connection part 210 and the cable insulating layer 14 may be formed to allow current flowing through the conductors 11 and the conductor connection part 210 to flow only in a longitudinal direction of the intermediate connection system 1 and to prevent the current from leaking in a radial direction.

The insulating restoration layer 214 may be formed by winding insulating paper or a non-cross-linked polypropylene tape to surround the conductor connection part 210, the exposed inner semiconducting layer (not shown) and the cable insulating layer 14. In the case of the paper-insulated power cable of FIG. 2, the insulating paper constituting the insulating restoration layer 214 may be composite insulating paper having excellent dielectric strength, and in the case of the XLPE power cable of FIG. 3, an insulating restoration layer may be formed of a cross-linked XLPE material by winding and molding the non-cross-linked polypropylene tape.

In the embodiments of FIGS. 2 and 3, the outer semiconducting restoration layer 16 may be provided outside the insulating restoration layer 214 as in the power cable.

The metal sheath restoration layer 222 may be restored outside the outer semiconducting restoration layer 216. As described above, the metal sheaths 22 of the power cables 100a and 100b are sealing means for preventing penetration of foreign substances such as moisture into the power cable power cables 100a and 100b, preventing loss of insulating oil, and ensuring sealing of the insulating oil, and may be formed of a material such as a lead sheath. To perform the same function as the metal sheath 22, a lead sheath tube may be disposed on the intermediate connector 200, both ends of the lead sheath tube may be fixed onto the metal sheaths 22 of the power cables 100a and 100b, and the metal sheath restoration layer 222 of the intermediate connector 200 may be restored using a tube reduction device (not shown) such as a tube reduction roller. The soldered part 2221 may be formed by soldering ends of the metal sheath restoration layer 222 and the metal sheaths 222.

The metal sheath restoration layer 222 is difficult to seal and thus cannot be restored by spirally cross-winding a lead sheath tape or the like, and therefore, the lead sheath tube is used.

Although FIGS. 2 and 3 illustrate that the lengths of exposed portions of the metal sheaths 22 of the cables for intermediate connection of the power cables are the same, exposed lengths or areas of the metal sheaths 22 may be different in an actual power cable connection process, because the metal sheath restoration layer 222 is restored by mounting a lead tube in advance on cables, which are to be connected and are stripped to expose the metal sheaths 22 to a large extent, moving the lead tube a connection site after connection or restoration of inner components, and performing a tube reduction process on the lead tube.

As described above, the ends of the metal sheath 22 of the power cables and the metal sheath restoration layer 222 may be finished by forming the soldered part 2221 thereon for airtightness sealing.

Soldering is a process of melting lead to finish a gap and thus is different from welding for fusing objects, which are to be finished, together. Particularly, an outer semiconducting layer or an outer semiconducting restoration layer may be provided in the metal sheath 22 or the metal sheath restoration layer 222, and a boundary area between ends of the metal sheath 22 and the metal sheath restoration layer 222 may be soldered by injecting molten lead into or applying the molten lead onto the boundary area without heating the boundary area by a torch or the like so as to prevent thermal deformation of the outer semiconducting layer or the outer semiconducting restoration layer during a soldering process.

As shown in the enlarged view of FIG. 2, the end of the metal sheath 22 of the intermediate connection structure 1 of a power cable and the end of the metal sheath restoration layer 222 may be disposed adjacent to each other in a horizontal direction while being spaced a predetermined distance from each other and the soldered part 2221 (namely, "butt-soldered part") may be provided on a boundary area therebetween.

In the forming of the soldered part 2221, the end of the metal sheath 22 of the power cable and the end of the metal sheath restoration layer 222 are disposed adjacent to each other in the horizontal direction while being spaced the predetermined distance from each other to minimize an increase of a diameter of the soldered part 2221 and prevent the concentration of internal pressure or stress.

That is, when the end of the metal sheath 22 and the end of the metal sheath restoration layer 222 are stacked together (see an "lap-soldered part" of FIG. 6 or 7), a total thickness of the stacked ends thereof is directly reflected, thus causing an increase of an outer diameter of the vicinity of the soldered part 2221 or irregularities of a surface of the intermediate connector 200, and therefore, the intermediate connector 200 of a power cable according to the present disclosure allows the end of the metal sheath 22 and the end of the metal sheath restoration layer 222 to be disposed adjacent to each other while being spaced apart from each other so that the soldered part 2221 may be formed on a boundary area therebetween.

Here, the predetermined distance is preferably in a range of about 5 mm to 20 mm.

When the predetermined distance was less than 5 mm, a molten solder liquid was not sufficiently injected into the boundary area, and when the predetermined distance was greater than 20 mm, the boundary area was not evenly soldered.

As shown in FIGS. 2 and 3, the metal taping layer 223 may be provided below the boundary area, which is located between the end of the metal sheath 22 and the end of the metal sheath restoration layer 222 and on which the soldered part 2221 is formed.

The metal taping layer 223 may be in contact with the end of the metal sheath 22, the end of the metal sheath restoration layer 222, and the soldered part 2221.

That is, the soldered part 2221 may be formed on the boundary area in a state in which the end of the metal sheath 22 and the end of the metal sheath restoration layer 222 are located adjacent to each other while being spaced the predetermined distance from each other, and the metal taping layer 223 may be provided as an insulation means below a space between the end of the metal sheath 22 and the end of the metal sheath restoration layer 222, i.e., below the soldered part 2221, to prevent thermal damage to the outer semiconducting restoration layer due to soldering and minimize an effect of thermal history on an insulating layer, etc. inside the outer semiconducting restoration layer.

A method of separating the end of the metal sheath 22 of the power cable and the end of the metal sheath restoration layer 222 by a distance d of 5 mm to 20 mm as described above will be described below.

After a lead tube serving as the metal sheath restoration layer 222 is mounted, an end of the lead tube may be stacked on the end of the metal sheath 22 of the power cable and thereafter the lead tube may be cut to separate the end of the lead tube and the end of the metal sheath 22 of the power cable from each other by the distance of 5 mm to 20 mm.

Thus, in the boundary area in which the soldered part 2221 is formed, the end of the metal sheath 22 and the end of the metal sheath restoration layer 222 are spaced apart from each other and the metal taping layer 223 is provided below the boundary area to minimize an increase in a thickness of the soldered part 2221, prevent thermal damage to the outer semiconducting layer 16 or the outer semiconducting restoration layer 216, and minimize thermal history of the insulating layer 14 or the insulating restoration layer 14.

Although the metal taping layer 223 is used as an insulation means, the metal taping layer 223 may also function as a solder frame preventing the permeation of a molten solder liquid, which is used to form the soldered part 2221, into the cable.

That is, when the end of the metal sheath 22 and the end of the metal sheath restoration layer 222 are separated from each other and a soldered part 2221 is formed on the boundary area therebetween to minimize an increase of a thickness of the vicinity of the soldered part, a molten solder liquid may permeate between the end of the metal sheath 22 and the outer semiconducting layer 16 or between the end of the metal sheath restoration layer 222 and the outer semiconducting restoration layer 216 and thus the molten solder liquid may thermally deteriorate the outer semiconducting layer 16 or the outer semiconducting restoration layer 216 or prevent the formation of the soldered part 2221.

Therefore, the metal taping layer 223 may protect inner components from being thermally deformed and function as a solder frame when the soldered part 2221 is formed by separating the end of the metal sheath 22 and the end of the metal sheath restoration layer 222 from each other.

That is, a metal blocking frame may be provided on the metal taping layer 223, the end of the metal sheath 22, and the end of the metal sheath restoration layer 222 in three directions with respect to cross sections thereof, thereby significantly improving joining performance of the soldered part 2221.

The metal taping layer 223 may be configured by winding a copper tape. Therefore, the metal taping layer 223 may be formed at a position on which the soldered part 2221 by winding a copper tap and approaching the metal sheath 22 and the metal sheath restoration layer 222 after making a gap between the metal sheath 22 and the metal sheath restoration layer 222 exposed by stripping multiple layers of the power cable, the lead tube may be moved to perform tube reduction, and the soldered part 2221 may be formed by soldering.

After the metal sheath 2221 is formed to airtightly join the metal sheath 22 and the metal sheath restoration layer 222, the metal strip restoration layer 226 and an anticorrosion layer are formed to complete the intermediate connector 200 of the power cable.

A width 1 of the metal taping layer 223 may be set to be greater than the distance between the end of the metal sheath 22 and the end of the metal sheath restoration layer 222, so that the metal taping layer 223 may function as a solder frame.

Alternatively, the width 1 of the metal taping layer 223 may be set to be substantially the same as a width of the soldered part 2221 to prevent thermal deformation of the outer semiconducting layer or the outer semiconducting restoration layer or prevent the propagation of heat into the outer semiconducting layer or the outer semiconducting restoration layer.

That is, the width 1 of the metal taping layer 223 is preferably greater than the predetermined distance of 5 mm to 20 mm.

As shown in FIGS. 2 and 3, the end of the metal sheath 22 and the end of the metal sheath restoration layer 222 on which the soldered part 2221 is formed may taper from top to bottom to form inclined surfaces 22S and 222S facing each other. When the end of the metal sheath 22 and the end of the metal sheath restoration layer 22 on which the soldered part 2221 is formed are configured as the inclined surfaces 22s and 222s, areas of contact between the soldered part 2221 formed by soldering, the end of the metal sheath 22, and the end of the metal sheath restoration layer 222 may increase, a thickness of the soldered part 2221 may gradually change, and a soldering joint area may increase, thereby improving the quality of joining using the soldered part 2221 and minimizing a variation in joining strength between regions of the soldered part 2221.

Widths S1 and S2 of the inclined surfaces of the ends of the metal sheath 22 and the metal sheath restoration layer 222 in the longitudinal direction of the intermediate connection structure 1 are preferably 20 mm or less when the quality of joining, workability, etc. according to an increase of the joining areas are considered.

As shown in FIGS. 2 and 3, the soldered part 2221 may be configured to finish the entire inclined surfaces of the ends of the metal sheath 22 and the metal sheath restoration layer 222 to prevent the formation of grooves and the like in an outer circumferential surface of a boundary area of the soldered part, thereby enhancing a level of flatness and preventing the concentration of stress when bent.

An increase of a diameter of the intermediate connection structure was minimized and a sealing function and a flexural property of the intermediate connection structure when repeatedly bent were ensured, when the soldered part 2221 was configured to finish the entire inclined surfaces of the ends of the metal sheath 22 and the metal sheath restoration layer 222, a maximum thickness of the soldered part was 1 or 1.3 times a thickness of the metal sheath 22 or a thickness of the metal sheath restoration layer 222, and a maximum thickness of the soldered part 2221 was 10 mm or less, when thicknesses, etc. of the metal sheath 22 and the metal sheath restoration layer 222 were considered.

A width of the soldered part 2221 of FIG. 2 or 3 may be in a range of about 20 mm to 60 mm.

The metal strip restoration layer 226 may be restored by cross-winding a metal strip about the outside of the metal sheath restoration layer 222, and a cable armor layer and the like may be additionally restored when a cable armor layer is provided according to the type of the power cable, thereby completing the intermediate connector 200 of a flexible joint type.

Although the metal strip layer 26 of the power cable 100 and the metal strip restoration layer 226 are illustrated as separate components in the embodiments of FIGS. 2 and 3, the metal strip restoration layer 226 may be restored at a site by restoring inner components by unwinding the metal strip layer 26 of the power cable 100 and binding a metal strip unwound after the binding of a binding tape layer 270. That is, the metal strip layer 26 of the power cable and the metal strip restoration layer 226 of the intermediate connector of the power cable may be configured consecutively not to be distinguished from each other by appearance.

In the intermediate connection structure 1 of a power cable according to the present disclosure as configured above, stress applied to a region of the soldered part 2221 due to internal pressure caused by heat generated in connectors of conductors, etc. of a pair of power cables connected through the intermediate connector of a power cable or due to external pressure generated due to an outer layer or the like may be suppressed, and the flexibility, reliability, stability, and durability of the intermediate connector of the power cable may be improved.

Table 1 below shows results of tests of comparing a sample of the butt-soldered part of FIG. 3 and a sample of the lap-soldered part of FIG. 7 (intermediate portions of an XLPE insulating layer) in terms of a flexural property, a tensile property, and thermal history.

The flexural property test was conducted by placing the samples on two points spaced a certain distance from each other, repeatedly applying load on the samples until the samples was destructed, and measuring the number of times of applying load. As shown in Table 1 below, in the flexural property test, the number of times of applying load on the butt-soldered part was 80 times and the number of times of applying load on the lap-soldered part was 65 times and thus the butt-soldered part was superior by 20% or more to the lap-soldered part.

In the tensile property test, the samples were placed on two points spaced a certain distance from each other and strain rates were measured until the samples were destructed. The butt-soldered part was superior by 40% or more to the lap-soldered part.

It is estimated that the flexural property and the tensile property were improved because a width of the soldered part formed on the boundary area between the metal sheath 22 and the metal sheath restoration layer 222 in contact with each other was large in a longitudinal direction of the intermediate connector and thus joining performance was improved.

In the thermal history test, whether there was an increase in temperature due to heat applied to an intermediate layer near the bottom of the soldered part, an insulating layer of the power cable, etc. due to heat applied during a soldering process, etc. In the thermal history test, the lower temperature measured at the insulating layer and the like, the better. In the thermal history test, thermal history of the insulating layer in the case of the butt-soldered part was 80° C. and thus was relatively low.

It may be analyzed that this was because heat applied to the butt-soldered part during the soldering process was evenly dispersed to the metal sheath 22, the metal sheath restoration layer 222, the lead tube, or the like and the metal taping layer 223 below the soldered part blocked part of heat propagated into the soldered part.

TABLE 1

| | soldering method | lap-soldered part | butt-soldered part |
|---|---|---|---|
| test of samples | flexural property | 65 times | 80 times |
| | tensile property (elongation) | 13% | 19% |
| | thermal history (measured with respect to an intermediate layer) | 94° C. | 80° C. |

The intermediate connection structure 200 of FIG. 2 or 3 is not in the form of a junction box but is configured by restoring each layer of the power cable by using the same material. The conductor connection part 210, the inner semiconducting restoration layer, the insulating restoration layer 214, the outer semiconducting restoration layer 216, and the metal sheath restoration layer 222 may be formed at the same layers or at substantially the same heights as the conductor, the inner semiconducting layer, the cable insulating layer 14, the outer semiconducting layer 16, and the metal sheath 22. Thus, an increase of a diameter of the intermediate connection structure 200 of a flexible joint type or a same-diameter joint types was minimized when an outer diameter of the intermediate connection structure 200 having the above structure was about 1.02 to 1.1 times that of the power cable. In relation to an outer diameter condition of the intermediate connection structure 200 and the power cable, when the outer diameter of the intermediate connection structure 200 was 1.02 times less than that of the power cable, a thickness of the insulating layer was not secured due to the intermediate connection structure 200 serving as a connector, and when the outer diameter of the intermediate connection structure 200 was 1.1 times greater than that of the power cable, the power cable was laid by being unwound from a turntable and thus mechanical strength such as flexural strength may reduce.

Figure 4:
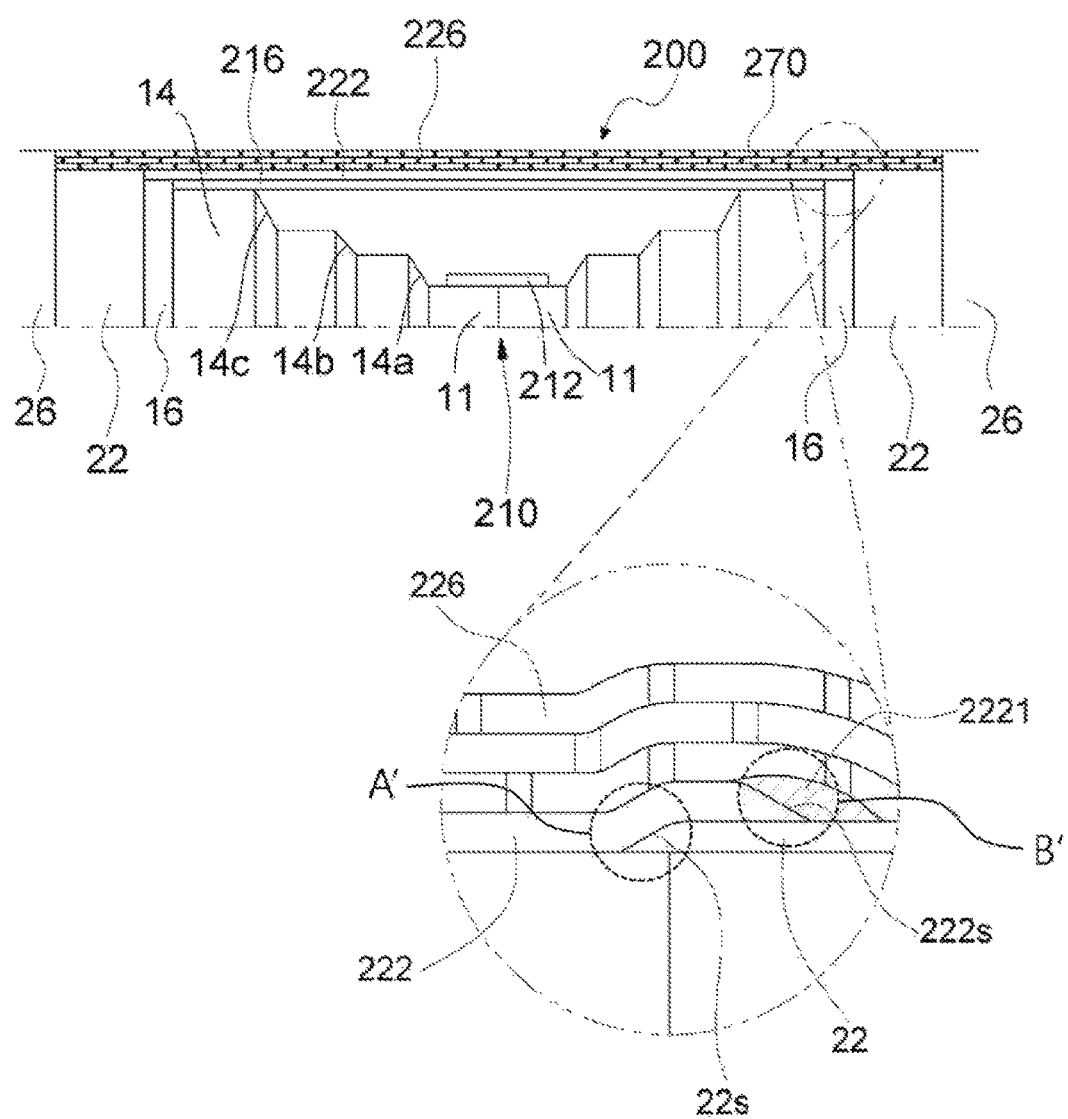
FIGS. 4 and 5 illustrate examples of an intermediate connection structure for flexibly connecting a pair of power cables.
Figure 5:
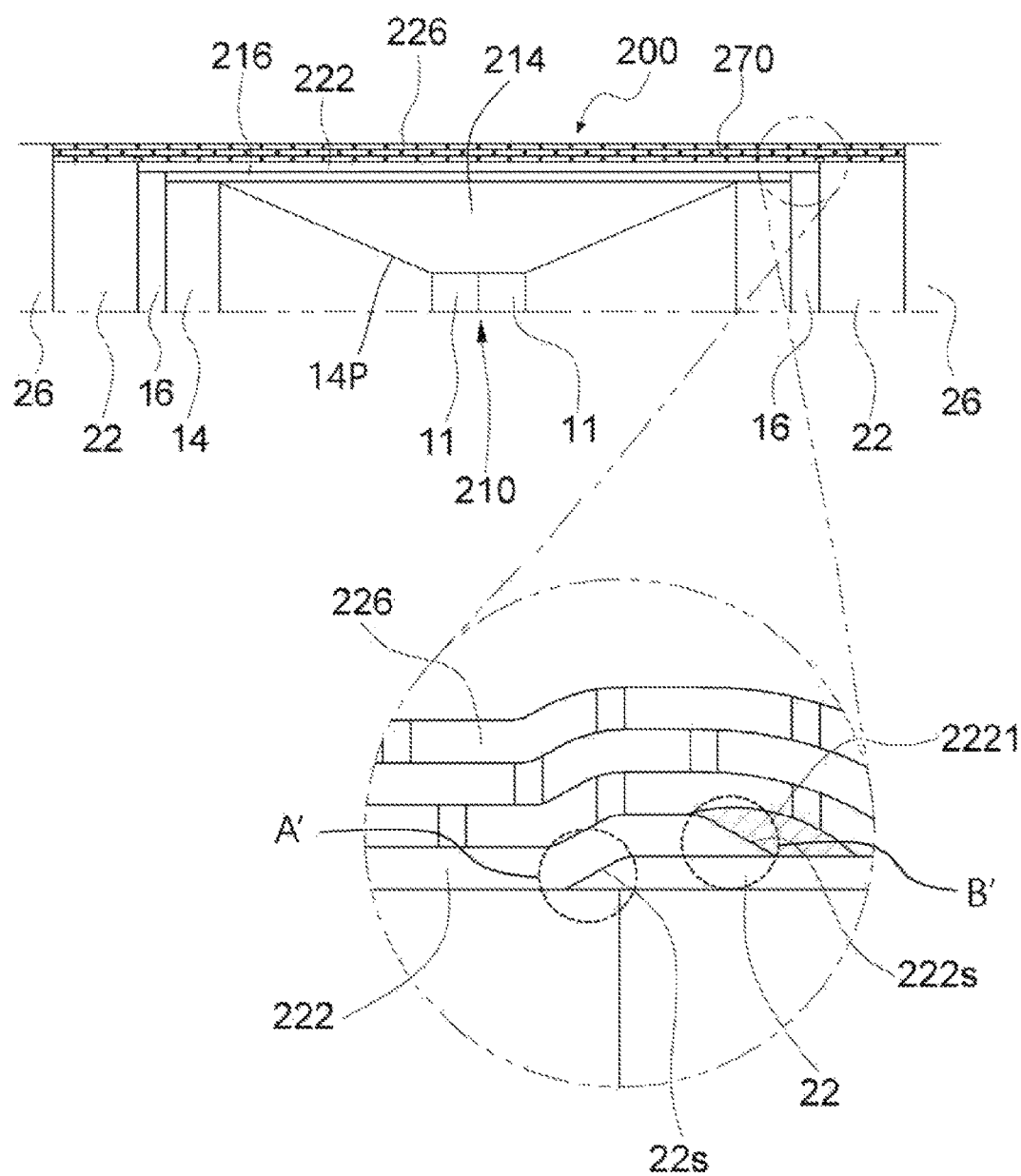

FIGS. 4 and 5 illustrate examples of an intermediate connection structure for flexibly connecting a pair of power cables according to another embodiment of the present disclosure. A description of parts that are the same as those described above with reference to FIGS. 2 and 3 will be omitted and differences from FIGS. 2 and 3 will be described below.

In the embodiments of FIGS. 4 and 5, in an intermediate connection structure 1 for connection of power cables 100a and 100b each including a conductor 11, an inner semiconducting layer (not shown), a cable insulating layer 14, an outer semiconducting layer 16, and a metal sheath 22, an intermediate connector 200 may include: a conductor connection part 210 for connection of a pair of conductors 11; an insulating restoration layer 214 for covering at least portions of the exposed conductors 11 of the power cables 100a and 100b, the conductor connection part 210, and the cable insulating layer 14; an outer semiconducting restoration layer 216 restored outside the insulating restoration layer 214; and a metal sheath restoration layer 222 restored outside the outer semiconducting restoration layer 216, wherein an end of the metal sheath 22 and an end of the metal sheath restoration layer 222 are processed to be inclined surfaces, the end of the metal sheath restoration layer 222 is stacked on the end of the metal sheath 22, and a soldered part 2221 is formed on a boundary area between outer circumferential surfaces of the ends of the metal sheath restoration layer and the metal sheath 22.

In the embodiments of FIGS. 4 and 5, the end of the metal sheath 22 and the end of the metal sheath restoration layer 222 are stacked together within a predetermined range (a stacked soldered part) unlike in the embodiments of FIGS. 2 and 3 in which the end of the metal sheath 22 and the end of the metal sheath restoration layer 222 are located adjacent in the horizontal direction while being spaced apart from each other but taper from top to bottom to form inclined surfaces 22s and 222s facing each other unlike in an intermediate connection structure of a power cable of the related art.

That is, as described above with reference to FIGS. 6 and 7, in the embodiments of FIGS. 4 and 5, the end of the metal sheath 22 and the end of the metal sheath restoration layer 222 are stacked together but are the inclined surfaces 22s and 222s, and thus, the concentration or application of stress to a region A', in which a lead tube is reduced to reduce a diameter, due to the corner of an end of the metal sheath 22 below the region A' may be minimized.

Figure 6:
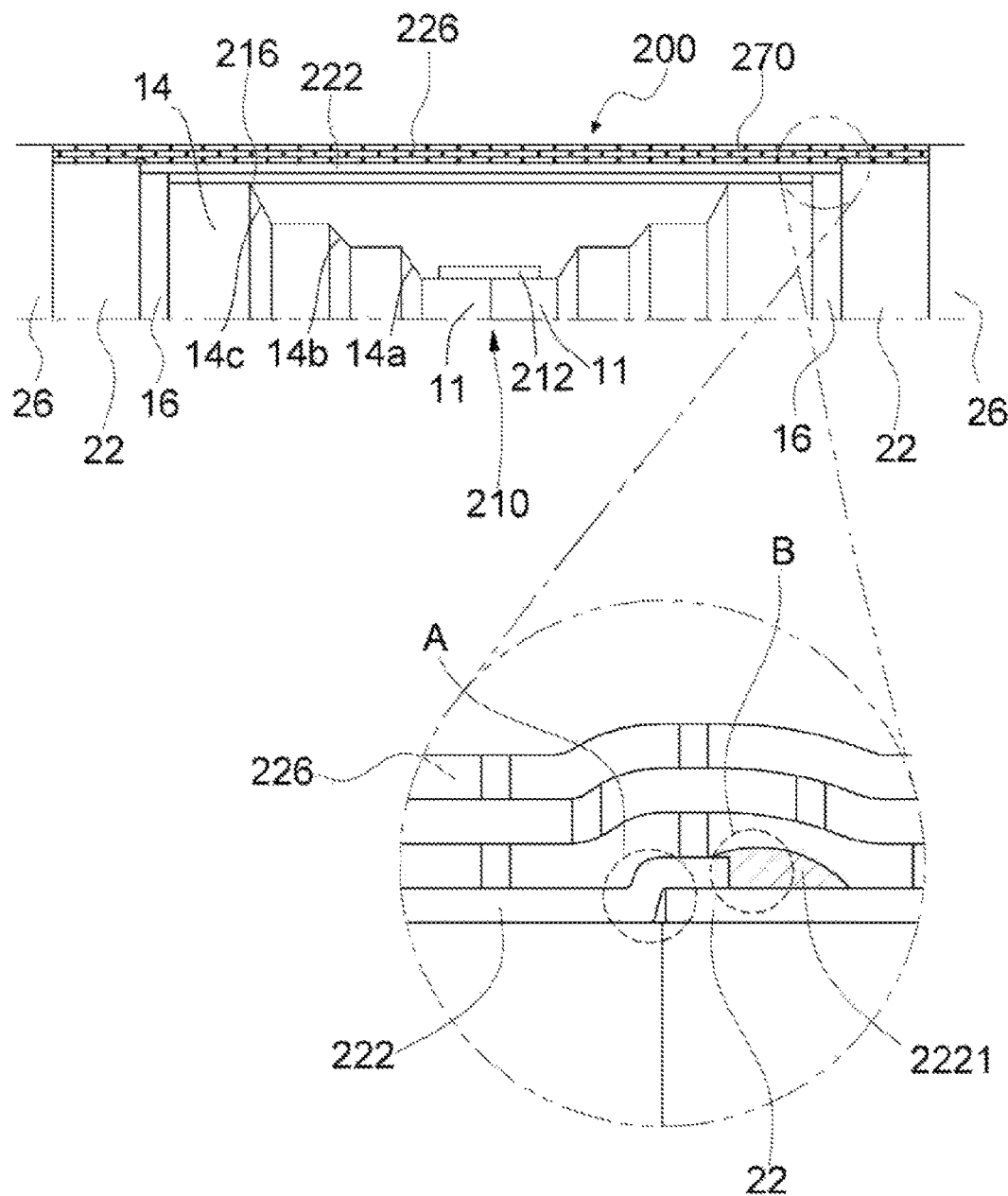
FIGS. 6 and 7 illustrate examples of an intermediate connection structure for flexibly connecting a pair of power cables.
Figure 7:
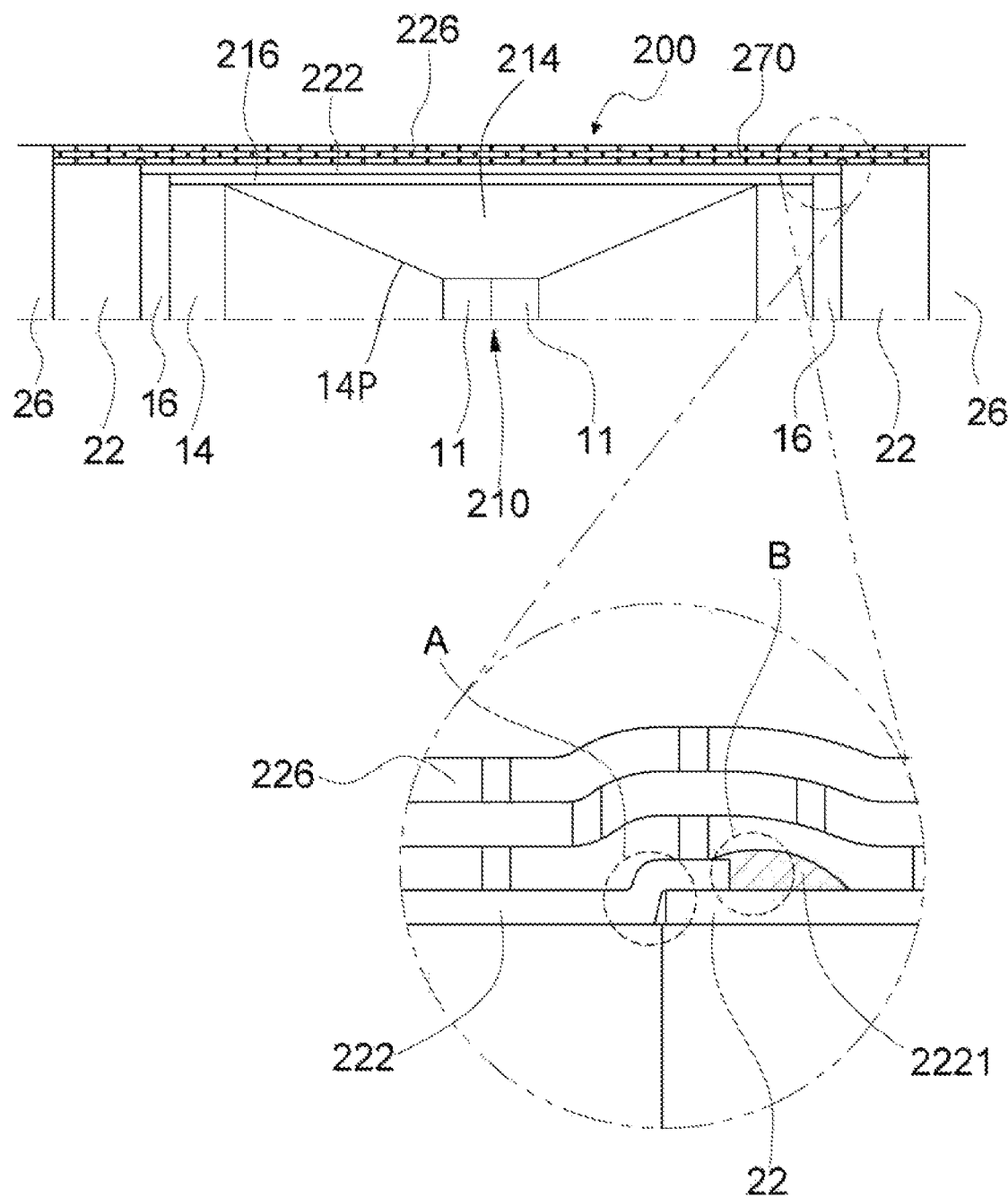

That is, the lead tube constituting the metal sheath restoration layer 222 is formed of a flexible material and has an outer circumferential surface having a gentle slope in the region A' according to the shape of the end of the metal sheath 22 during the reduction of the lead tube, unlike in the embodiments of FIGS. 6 and 7.

In a region B' in which a soldered part is formed, an end of the lead tube constituting the metal sheath restoration layer 222 is processed to have an inclined surface 222s so that an area of contact between the soldered part 2221 and the lead tube may increase and a thickness of the soldered part 2221 may gradually change, as in the embodiments of FIGS. 2 and 3.

That is, in all of the embodiments of FIGS. 2 and 3 and the embodiments of FIGS. 4 and 5, a region in which the soldered part is formed varies according to whether the end of the metal sheath 22 and the end of the metal sheath restoration layer 222 are spaced apart from each other in the horizontal direction or are stacked together but the ends may taper from top to bottom to have inclined surfaces having a gentle slope and facing each other, thereby preventing the concentration of stress on a boundary area and increasing an area of contact of the soldered part.

Similar to the previous embodiments, in the embodiment of FIGS. 4 and 5, widths of the inclined surfaces 22S and 222S of the end of the metal sheath 22 and the end of the metal sheath restoration layer 222 in the longitudinal direction of the intermediate connection structure may be 20 mm or less, a width of the soldered part may be in a range of 20 mm to 60 mm, and a maximum thickness t of the soldered part may be 10 mm or less for the reasons described above with respect to the previous embodiments.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An intermediate connection structure of a power cable for connecting a pair of power cables, wherein the power cable comprises a conductor, an inner semiconducting layer outside the conductor, a cable insulating layer outside the inner semiconducting layer, an outer semiconducting layer outside the cable insulating layer, and a metal sheath outside the outer semiconducting layer, and the intermediate connection structure comprises a conductor connection part to which a pair of conductors are connected, an inner semiconducting restoration layer outside the exposed conductor of the power cable and the conductor connection part, an insulating restoration layer for covering at least portions of the inner semiconducting restoration layer and the cable insulating layer, an outer semiconducting restoration layer outside the insulating restoration layer, and a metal sheath restoration layer outside the outer semiconducting restoration layer, wherein an end of the metal sheath of the power cable and an end of the metal sheath restoration layers are spaced a predetermined distance from each other, a metal taping layer is provided below a boundary area between the end of the metal sheath of the power cable and the end of the metal sheath restoration layer, and the boundary area is finished with a soldered part.

2. The intermediate connection structure of claim 1, wherein a width of the metal taping layer is greater than the predetermined distance.

3. The intermediate connection structure of claim 2, wherein the predetermined distance is in a range of 5 mm to 20 mm.

4. The intermediate connection structure of claim 1, wherein the end of the metal sheath and the end of the metal sheath restoration layer taper from top to bottom to have inclined surfaces facing each other.

5. The intermediate connection structure of claim 4, wherein widths of the inclined surfaces of the end of the metal sheath and the end of the metal sheath restoration layer in a longitudinal direction of the intermediate connection structure are 20 mm or less.

6. The intermediate connection structure of claim 4, wherein the entire inclined surfaces of the end of the metal sheath and the end of the metal sheath restoration layer are finished with the soldered part.

7. The intermediate connection structure of claim 5, wherein a width of the soldered part is in a range of 20 mm to 60 mm.

8. The intermediate connection structure of claim 1, wherein a maximum thickness of the soldered part is 1 to 1.3 times a thickness of the metal sheath or a thickness of the metal sheath restoration layer.

9. The intermediate connection structure of claim 7, wherein a maximum thickness of the soldered part is 10 mm or less.

10. The intermediate connection structure of claim 1, wherein the metal taping layer is in contact with the end of the metal sheath, the end of the metal sheath restoration layer, and the soldered part.

11. The intermediate connection structure of claim 1, wherein an outer diameter of the intermediate connection structure is 1.02 to 1.1 times that of the power cable.

12. The intermediate connection structure of claim 1, wherein the conductor connection part, the inner semiconducting restoration layer, the insulating restoration layer, the outer semiconducting restoration layer, and the metal sheath restoration layer are located at the same layers as the conductor, the inner semiconducting layer, the cable insulating layer, the outer semiconducting layer, and the metal sheath.

13. An intermediate connection structure for connection of a power cable which includes a conductor, an inner semiconducting layer, a cable insulating layer, an outer semiconducting layer, and a metal sheath, and the intermediate connection structure comprises a conductor connection part to which the conductor of the power cable is connected; an insulating restoration layer for covering at least portions of the conductor of the power cable, the conductor connection part, and the cable insulating layer; an outer semiconducting restoration layer restored outside the insulating restoration layer; and a metal sheath restoration layer restored outside the outer semiconducting restoration layer, wherein an insulation means is provided below a boundary area between an end of the metal sheath of the power cable and an end of the metal sheath restoration layer, and the boundary area below which the insulation means is provided is finished with a soldered part.

14. The intermediate connection structure of claim 13, wherein the end of the metal sheath of the power cable and the end of the metal sheath restoration layer are spaced a predetermined distance from each other.

15. The intermediate connection structure of claim 14, wherein the insulation means is configured by winding a copper tape, wherein a width of the copper tape is greater than the predetermined distance.

16. The intermediate connection structure of claim 14, wherein the end of the metal sheath of the power cable and the end of the metal sheath restoration layer are inclined surfaces facing each other, and the soldered part is configured to finish the entire inclined surfaces.

17. An intermediate connection structure for connection of a power cable which includes a conductor, an inner semiconducting layer, a cable insulating layer, an outer semiconducting layer, and a metal sheath, and
the intermediate connection structure comprises a conductor connection part to which a pair of conductors are connected, an insulating restoration layer for covering at least portions of the exposed conductor of the power cable, the conductor connection part, and the cable insulating layer, an outer semiconducting restoration layer restored outside the insulating restoration layer, and a metal sheath restoration layer restored outside the outer semiconducting restoration layer,
wherein an outer circumferential surface of an end of the metal sheath and an outer circumferential surface of an end of the metal sheath restoration layer are processed as inclined surfaces, the end of the metal sheath restoration layer is stacked on the end of the metal sheath, and a soldered part is formed at a boundary area between the outer circumferential surface of the end of the metal sheath restoration layer and the outer circumferential surface of the end of the metal sheath.

18. The intermediate connection structure of claim 17, wherein the end of the metal sheath and the end of the metal sheath restoration layer taper from top to bottom and thus the outer circumferential surfaces thereof are inclined surfaces facing each other.

19. The intermediate connection structure of claim 17, wherein widths of the inclined surfaces of the end of the metal sheath and the end of the metal sheath restoration layer in a longitudinal direction of the intermediate connection structure are 20 mm or less.

20. The intermediate connection structure of claim 17, wherein a width of the soldered part is in a range of 20 mm to 60 mm.

21. The intermediate connection structure of claim 17, wherein a maximum thickness of the soldered part on the boundary area is 10 mm or less.

* * * * *